(12) United States Patent
Harville

(10) Patent No.: US 8,995,820 B2
(45) Date of Patent: *Mar. 31, 2015

(54) ITERATIVE, MAXIMALLY PROBABLE, BATCH-MODE COMMERCIAL DETECTION FOR AUDIOVISUAL CONTENT

(71) Applicant: Interval Licensing LLC, Seattle, WA (US)

(72) Inventor: Michael L. Harville, Palo Alto, CA (US)

(73) Assignee: Interval Licensing LLC, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/154,999

(22) Filed: Jan. 14, 2014

(65) Prior Publication Data

US 2014/0126887 A1 May 8, 2014

Related U.S. Application Data

(60) Division of application No. 12/835,505, filed on Jul. 13, 2010, now Pat. No. 8,630,536, which is a continuation of application No. 11/250,083, filed on Oct. 12, 2005, now Pat. No. 7,778,519, which is a (Continued)

(51) Int. Cl.
*H04N 9/80* (2006.01)
*G11B 27/031* (2006.01)

(Continued)

(52) U.S. Cl.
CPC .............. *G11B 27/031* (2013.01); *H04N 5/76* (2013.01); *H04N 5/781* (2013.01); *H04N 5/782* (2013.01);

(Continued)

(58) Field of Classification Search
CPC ..... Y10S 358/908; G11B 27/031; H04N 9/87
USPC ................... 386/249, 250, 251, 278
See application file for complete search history.

(56) References Cited

U.S. PATENT DOCUMENTS

| 3,868,675 A | 2/1975 | Firmin |
| 4,258,386 A | 3/1981 | Cheung et al. |

(Continued)

FOREIGN PATENT DOCUMENTS

| JP | 2054331 | 2/1990 |
| JP | 403179895 | 8/1991 |

(Continued)

OTHER PUBLICATIONS

"About GAIN Ad Vehicles," http://www.gainpublishing.com/about, pp. 1-2 [accessed Apr. 26, 2004].

(Continued)

*Primary Examiner* — David Harvey
(74) *Attorney, Agent, or Firm* — Perkins Coie LLP

(57) ABSTRACT

Identification of starting and ending times of commercial breaks and commercials within those commercial breaks found in audiovisual content is disclosed. A solution to a "batch optimization" problem is used in which commercial locations within a set of audiovisual content are detected as a group by choosing a set of commercial locations which optimizes a cost function which can include considerations of, for example, 1) one or more cues, 2) relative locations of commercials within the audiovisual content, and/or 3) probability models based on statistics obtained regarding characteristics of typical commercial and commercial breaks. Optimization can be done over the total set of commercial location decisions, rather than on a per-commercial basis. Additionally, the cost function can be iteratively evaluated and many more types of cues and combinations of cues can be used in detection of commercials.

19 Claims, 4 Drawing Sheets

Related U.S. Application Data continuation of application No. 09/715,901, filed on Nov. 18, 2000, now Pat. No. 6,993,245.

(60) Provisional application No. 60/166,528, filed on Nov. 18, 1999.

(51) Int. Cl.
| | |
|---|---|
| H04N 5/76 | (2006.01) |
| H04N 5/781 | (2006.01) |
| H04N 5/782 | (2006.01) |
| H04N 5/85 | (2006.01) |
| H04N 5/907 | (2006.01) |
| H04N 7/16 | (2011.01) |
| H04N 21/438 | (2011.01) |
| H04N 21/44 | (2011.01) |
| H04N 21/81 | (2011.01) |
| H04N 9/87 | (2006.01) |

(52) U.S. Cl.
CPC ............... *H04N 5/85* (2013.01); *H04N 5/907* (2013.01); *H04N 7/163* (2013.01); *H04N 21/438* (2013.01); *H04N 21/44008* (2013.01); *H04N 21/812* (2013.01); *H04N 9/87* (2013.01); *Y10S 358/908* (2013.01)
USPC .......................................... 386/250; 358/908

(56) References Cited

U.S. PATENT DOCUMENTS

| | | |
|---|---|---|
| 4,319,286 A | 3/1982 | Hanpachern |
| 4,390,904 A | 6/1983 | Johnston et al. |
| 4,546,382 A | 10/1985 | McKenna et al. |
| 4,602,279 A | 7/1986 | Freeman |
| 4,750,052 A | 6/1988 | Poppy et al. |
| 4,750,053 A | 6/1988 | Allen |
| 4,752,834 A | 6/1988 | Koombes |
| 4,782,401 A | 11/1988 | Faerber et al. |
| 4,841,291 A | 6/1989 | Swix et al. |
| 4,845,658 A | 7/1989 | Gifford |
| 4,858,000 A | 8/1989 | Lu |
| 4,907,079 A | 3/1990 | Turner et al. |
| 4,931,865 A | 6/1990 | Scarampi |
| 5,105,184 A | 4/1992 | Pirani et al. |
| 5,151,788 A | 9/1992 | Blum |
| 5,164,992 A | 11/1992 | Turk et al. |
| 5,223,924 A | 6/1993 | Strubbe |
| 5,231,494 A | 7/1993 | Wachob |
| 5,295,064 A | 3/1994 | Malec et al. |
| 5,305,195 A | 4/1994 | Murphy |
| 5,347,632 A | 9/1994 | Filepp et al. |
| 5,410,344 A | 4/1995 | Graves et al. |
| 5,422,986 A | 6/1995 | Neely |
| 5,436,637 A | 7/1995 | Gayraud et al. |
| 5,440,337 A | 8/1995 | Henderson et al. |
| 5,446,919 A | 8/1995 | Wilkins |
| 5,481,294 A | 1/1996 | Thomas et al. |
| 5,497,185 A | 3/1996 | Dufresne et al. |
| 5,498,002 A | 3/1996 | Gechter |
| 5,504,518 A | 4/1996 | Ellis et al. |
| 5,515,098 A | 5/1996 | Carles |
| 5,532,735 A | 7/1996 | Blahut et al. |
| 5,546,071 A | 8/1996 | Zdunich |
| 5,550,735 A | 8/1996 | Slade et al. |
| 5,550,928 A | 8/1996 | Lu et al. |
| 5,550,965 A | 8/1996 | Gabbe et al. |
| 5,559,549 A | 9/1996 | Hendricks et al. |
| 5,572,643 A | 11/1996 | Judson |
| 5,579,055 A | 11/1996 | Hamilton et al. |
| 5,583,560 A | 12/1996 | Florin et al. |
| 5,589,892 A | 12/1996 | Knee et al. |
| 5,596,373 A | 1/1997 | White et al. |
| 5,600,364 A | 2/1997 | Hendricks et al. |
| 5,600,573 A | 2/1997 | Hendricks et al. |
| 5,608,445 A | 3/1997 | Mischler et al. |
| 5,619,709 A | 4/1997 | Caid et al. |
| 5,659,350 A | 8/1997 | Hendricks et al. |
| 5,661,516 A | 8/1997 | Carles |
| 5,682,195 A | 10/1997 | Hendricks et al. |
| 5,704,017 A | 12/1997 | Heckerman et al. |
| 5,708,478 A | 1/1998 | Tognazzini |
| 5,717,814 A | 2/1998 | Abecassis |
| 5,717,923 A | 2/1998 | Dedrick |
| 5,724,091 A | 3/1998 | Freeman et al. |
| 5,724,424 A | 3/1998 | Gifford |
| 5,724,472 A | 3/1998 | Abecassis |
| 5,724,521 A | 3/1998 | Dedrick |
| 5,729,279 A | 3/1998 | Fuller |
| 5,734,853 A | 3/1998 | Hendricks et al. |
| 5,740,549 A | 4/1998 | Reilly et al. |
| 5,754,939 A | 5/1998 | Herz et al. |
| 5,758,258 A | 5/1998 | Shoff et al. |
| 5,761,606 A | 6/1998 | Wolzien |
| 5,767,857 A | 6/1998 | Neely |
| 5,767,894 A | 6/1998 | Fuller et al. |
| 5,768,528 A | 6/1998 | Stumm |
| 5,771,307 A | 6/1998 | Lu et al. |
| 5,774,170 A | 6/1998 | Hite et al. |
| 5,786,845 A | 7/1998 | Tsuria et al. |
| 5,793,409 A | 8/1998 | Tetsumura et al. |
| 5,794,210 A | 8/1998 | Goldhaber et al. |
| 5,798,785 A | 8/1998 | Hendricks et al. |
| 5,801,747 A | 9/1998 | Bedard |
| 5,805,974 A | 9/1998 | Hite et al. |
| 5,812,647 A | 9/1998 | Beaumont et al. |
| 5,812,732 A | 9/1998 | Dettmer et al. |
| 5,818,512 A | 10/1998 | Fuller |
| 5,819,284 A | 10/1998 | Farber et al. |
| 5,826,165 A | 10/1998 | Echeita et al. |
| 5,828,839 A | 10/1998 | Moncreiff |
| 5,835,667 A | 11/1998 | Wactlar et al. |
| 5,862,324 A | 1/1999 | Collins |
| 5,870,151 A | 2/1999 | Korber |
| 5,872,588 A | 2/1999 | Aras et al. |
| 5,872,850 A | 2/1999 | Klein et al. |
| 5,873,068 A | 2/1999 | Beaumont et al. |
| 5,874,986 A | 2/1999 | Gibbon et al. |
| 5,877,755 A | 3/1999 | Hellhake |
| 5,892,535 A | 4/1999 | Allen et al. |
| 5,892,554 A | 4/1999 | DiCicco et al. |
| 5,892,691 A | 4/1999 | Fowler |
| 5,900,919 A | 5/1999 | Chen et al. |
| 5,903,816 A | 5/1999 | Broadwin et al. |
| 5,907,322 A | 5/1999 | Kelly et al. |
| 5,913,040 A | 6/1999 | Rakavy et al. |
| 5,915,243 A | 6/1999 | Smolen |
| 5,917,553 A | 6/1999 | Honey et al. |
| 5,918,014 A | 6/1999 | Robinson |
| 5,926,207 A | 7/1999 | Vaughan et al. |
| 5,929,849 A | 7/1999 | Kikinis |
| 5,933,150 A | 8/1999 | Ngo et al. |
| 5,933,811 A | 8/1999 | Angles et al. |
| 5,945,988 A | 8/1999 | Williams et al. |
| 5,946,646 A | 8/1999 | Schena et al. |
| 5,948,061 A | 9/1999 | Merriman et al. |
| 5,953,076 A | 9/1999 | Astle et al. |
| 5,959,623 A | 9/1999 | van Hoff et al. |
| 5,966,120 A | 10/1999 | Arazi et al. |
| 5,974,398 A | 10/1999 | Hanson et al. |
| 5,977,964 A | 11/1999 | Williams et al. |
| 5,990,927 A | 11/1999 | Hendricks et al. |
| 6,002,393 A | 12/1999 | Hite et al. |
| 6,002,831 A * | 12/1999 | Tada et al. ..................... 386/249 |
| 6,002,833 A | 12/1999 | Abecassis |
| 6,005,564 A | 12/1999 | Ahmad et al. |
| 6,006,197 A | 12/1999 | d'Eon et al. |
| 6,006,257 A | 12/1999 | Slezak |
| 6,008,802 A | 12/1999 | Iki et al. |
| 6,011,895 A | 1/2000 | Abecassis |
| 6,012,051 A | 1/2000 | Sammon, Jr. et al. |
| 6,020,883 A | 2/2000 | Herz et al. |
| 6,020,931 A | 2/2000 | Bilbrey et al. |

(56) References Cited

U.S. PATENT DOCUMENTS

| | | |
|---|---|---|
| 6,026,369 A | 2/2000 | Capek |
| 6,029,045 A | 2/2000 | Picco et al. |
| 6,034,652 A | 3/2000 | Freiberger et al. |
| 6,036,601 A | 3/2000 | Heckel |
| 6,038,367 A | 3/2000 | Abecassis |
| 6,044,376 A | 3/2000 | Kurtzman, II |
| 6,052,492 A | 4/2000 | Bruckhaus |
| 6,052,554 A | 4/2000 | Hendricks et al. |
| 6,075,551 A | 6/2000 | Berezowski et al. |
| 6,100,941 A | 8/2000 | Dimitrova et al. |
| 6,104,425 A | 8/2000 | Kanno |
| 6,112,192 A | 8/2000 | Capek |
| 6,141,010 A | 10/2000 | Hoyle |
| 6,141,463 A | 10/2000 | Covell et al. |
| 6,160,570 A | 12/2000 | Sitnik |
| 6,169,542 B1 | 1/2001 | Hooks et al. |
| 6,177,931 B1 | 1/2001 | Alexander et al. |
| 6,208,386 B1 | 3/2001 | Wilf et al. |
| 6,237,022 B1 | 5/2001 | Bruck et al. |
| 6,240,555 B1 | 5/2001 | Shoff et al. |
| 6,243,104 B1 | 6/2001 | Murray |
| 6,275,646 B1* | 8/2001 | Tada et al. ............... 386/249 |
| 6,282,713 B1 | 8/2001 | Kitsukawa et al. |
| 6,286,005 B1 | 9/2001 | Cannon |
| 6,314,569 B1 | 11/2001 | Chernock et al. |
| 6,324,519 B1 | 11/2001 | Eldering |
| 6,351,265 B1 | 2/2002 | Bulman |
| 6,357,043 B1 | 3/2002 | Ellis et al. |
| 6,363,380 B1 | 3/2002 | Dimitrova |
| 6,438,751 B1 | 8/2002 | Voyticky et al. |
| 6,457,010 B1 | 9/2002 | Eldering et al. |
| 6,484,148 B1 | 11/2002 | Boyd |
| 6,519,769 B1 | 2/2003 | Hopple et al. |
| 6,526,215 B2 | 2/2003 | Hirai et al. |
| 6,560,281 B1 | 5/2003 | Black et al. |
| 6,570,499 B2 | 5/2003 | Kaganer |
| 6,574,793 B1 | 6/2003 | Ngo et al. |
| 6,597,405 B1 | 7/2003 | Iggulden |
| 6,615,408 B1 | 9/2003 | Kaiser et al. |
| 6,681,393 B1 | 1/2004 | Bauminger et al. |
| 6,684,194 B1 | 1/2004 | Eldering et al. |
| 6,698,020 B1 | 2/2004 | Zigmond et al. |
| 6,708,335 B1 | 3/2004 | Ozer et al. |
| 6,735,776 B1 | 5/2004 | Legate |
| 6,750,880 B2 | 6/2004 | Freiberger et al. |
| 6,788,314 B1 | 9/2004 | Freiberger et al. |
| 6,819,863 B2 | 11/2004 | Dagtas et al. |
| 6,906,732 B1 | 6/2005 | Li et al. |
| 6,937,658 B1 | 8/2005 | Suito et al. |
| 6,968,565 B1 | 11/2005 | Slaney et al. |
| 6,993,245 B1* | 1/2006 | Harville ............... 386/250 |
| 7,134,130 B1 | 11/2006 | Thomas |
| 7,134,132 B1 | 11/2006 | Ngo et al. |
| 7,209,631 B2 | 4/2007 | Tada et al. |
| 7,272,295 B1 | 9/2007 | Christopher |
| 7,319,964 B1 | 1/2008 | Huang et al. |
| 7,348,935 B1 | 3/2008 | Freiberger et al. |
| 7,409,437 B2 | 8/2008 | Ullman et al. |
| 7,661,116 B2 | 2/2010 | Slaney et al. |
| 7,720,432 B1 | 5/2010 | Colby et al. |
| 7,765,574 B1 | 7/2010 | Maybury et al. |
| 7,778,519 B2 | 8/2010 | Harville |
| 7,844,985 B2 | 11/2010 | Hendricks et al. |
| 8,397,255 B2 | 3/2013 | Wachtfogel et al. |
| 8,522,274 B2 | 8/2013 | Slaney et al. |
| 2002/0046084 A1 | 4/2002 | Steele et al. |
| 2002/0062481 A1 | 5/2002 | Slaney et al. |
| 2003/0055831 A1 | 3/2003 | Ryan et al. |
| 2003/0110499 A1 | 6/2003 | Knudson et al. |
| 2003/0200128 A1 | 10/2003 | Doherty |
| 2004/0194131 A1 | 9/2004 | Ellis et al. |
| 2009/0210902 A1 | 8/2009 | Slaney et al. |
| 2010/0242063 A1 | 9/2010 | Slaney et al. |
| 2010/0281499 A1 | 11/2010 | Harville |
| 2013/0014157 A1 | 1/2013 | Harville |
| 2013/0086608 A1 | 4/2013 | Slaney et al. |

FOREIGN PATENT DOCUMENTS

| | | |
|---|---|---|
| JP | 403184484 | 8/1991 |
| JP | 403229597 | 10/1991 |
| JP | 4051628 | 2/1992 |
| JP | 05037870 | 2/1993 |
| JP | 406303569 | 10/1994 |
| JP | 7507169 | 8/1995 |
| JP | 408235676 | 9/1996 |
| JP | 9269923 | 10/1997 |
| JP | 409284706 | 10/1997 |
| JP | 411008835 | 1/1999 |
| JP | 611261909 | 9/1999 |
| WO | WO-9319427 | 9/1993 |
| WO | WO-94/13107 | 6/1994 |
| WO | WO-94/16442 | 7/1994 |
| WO | WO-95/15649 | 6/1995 |
| WO | WO-95/15658 | 6/1995 |
| WO | WO-96/24115 | 8/1996 |
| WO | WO-9630864 | 10/1996 |
| WO | WO-97/00494 | 1/1997 |
| WO | WO-97/00581 | 1/1997 |
| WO | WO-97/00582 | 1/1997 |
| WO | WO-97/41683 | 11/1997 |
| WO | WO-98/24242 | 6/1998 |
| WO | WO-98/24243 | 6/1998 |
| WO | WO-98/28906 | 7/1998 |
| WO | WO-9904561 | 1/1999 |
| WO | WO-99/38320 | 7/1999 |
| WO | WO-99/45702 | 9/1999 |
| WO | WO-99/52285 | 10/1999 |
| WO | WO-99/55066 | 10/1999 |
| WO | WO-99/60789 | 11/1999 |
| WO | WO-00/22818 | 4/2000 |
| WO | WO-00/33160 | 6/2000 |
| WO | WO-00/33163 | 6/2000 |
| WO | WO-00/33228 | 6/2000 |
| WO | WO-00/33233 | 6/2000 |

OTHER PUBLICATIONS

"Double Click Press Kit," www.doubleclick.com, 2 pages.
"GAIN—Support Center," http://www.gainpublishing.com/help/gainfaq.html, pp. 1-5 [accessed Apr. 26, 2004].
"GAIN Publishing-Software," http://www.gainpublishing.com/software, pp. 1-3.
"General Instrument & ACTV to Offer a Complete Solution for Addressable, Targeted Digital Television Advertising," ACTV and The BOX Music Network, Press Release, www.actv.com/newpage/press/actvgiad.html, Jun. 14, 1999, 3 pages.
"MIT Media Lab's Hypersoap uses hyperlinks to mix shopping, entertainment," MIT News, Nov. 9, 1998, 3 pgs. [Internet accessed on Nov. 23, 1999].
"Scientific-Atlanta's Explorer 2000 Advanced Digital Set-Top Will Support ACTV's '*Individualized Television*,'," ACTV and Scientific-Atlanta, Press Release, www.actv.com/newpage/press/actvsatl.html, Jan. 25, 1999, 3 pages.
"What is Wink: How wink works," www.wink.com, 3 pages.
Adauction.com, http://web.archive.org/web/20000302051902/http://www.adauction.com, pp. 1-2, internet archive date of Mar. 2, 2000 [accessed Apr. 6, 2007].
AsSeenIn.com, http://www.asseenin.com/asseenin/infor, 3 pgs. [Internet accessed on Jan. 12, 2000].
Bove, M., et al., "Adding Hyperlinks to Digital Television," MIT Media Laboratory, Proc. 140th SMPTE Technical Conference, 1998, 11 pages.
Bregler et al., "Video Rewrite: Driving Visual Speech with Audio," Interval Research Corporation, Abstract and ACM SIGGRAPH 97 Paper, 10 pages.
Claria, Products and Services Overview, http://www.clairia.com/products/index.html, pp. 1-3 [Internet accessed Apr. 26, 2004].

(56) References Cited

OTHER PUBLICATIONS

Darrelli et al., "A Virtual Mirror Interface using Real-time Robust Face Tracking," Proceedings of the Third International Conference on Face and Gesture Recognition, Apr. 1998, IEEE Computer Society Press, Nara, Japan, 20 pages.

Delio, M., "TV Commercials Get Personal," Wired News, Sep. 20, 2000, www.wired.com/news/print/0.1294.38754.00.html, 3 pages.

Ebert, R., "The Incredible Shrinking Media Lab," Y-Life: Roger Ebert-Critical Eye, Mar. 1999, http://www.zdnet.com, 3 pgs. [Internet accessed on Nov. 23, 1999].

Fujikawa, "Subrogation of User Account by Advertisement", Nikkei Communications, Nikkei BP Company, Mar. 4, 1996, Japan, No. 217, p. 54.

Gomes, "Upstart's Internet 'TV' Has Microsoft Tuned In," Wall Street Journal, Aug. 1996, 1 page.

Koenen, R., "Overview of the MPEG-4 Standard," International Organisation for Standardisation Organisation Internatioanale De Normalisation ISO/IEC JTC1/SC29/WG11 Coding of Moving Pictures and Audio, Mar. 2001, ISO/IEC JTC1/SC29/WG11 N4030, http://www.cselt.it/mpeg/standars/mpeg-4/mpeg-4.htm, pp. 1-78.

Lyon, R. F., "The Optical Mouse, and an Architectural Methodology for Smart Digital Sensors," Xerox PARC, VLSI-81-1, Aug. 1981, 38 pages.

Moghaddam et al., "Research Index: Probabilistic Visual learning for Object Detection," http://citeseer.nj.nec.com/moghaddam95probabilistic.html, 1995, 3 pages.

Moghaddam, B. et al., "Abstract: Probabilistic Visual learning for Object Detection," IEEE Transactions on Pattern Analysis and Machine Intelligence, vol. 19, No. 7, Jul. 1997, www.computer.org/tpami/tp1997/i0696abs.htm, 1 page.

Rigdon, "Screen Savers Go Beyond Fish, Flying Toasters," Wall Street Journal, Feb. 13, 1996, 1 page.

Staff Reporter, "PointCast Inc. is Testing New Screen-Saver Product," Wall Street Journal, May 1996, 1 page.

Sutton et al., "Reinforcement Learning: An Introduction," http://www-anw.cs.umass.edu/~rich/book/the-book.html, MIT Press, Cambridge, MA, 1998, 4 pages.

\* cited by examiner

R(t) Computed over several episodes/versions of a particular, recurring 30-minute show

ITERATIVE, MAXIMALLY PROBABLE, BATCH-MODE COMMERCIAL DETECTION FOR AUDIOVISUAL CONTENT

CROSS-REFERENCE TO RELATED APPLICATION(S)

This application is a divisional of U.S. patent application Ser. No. 12/835,505, entitled ITERATIVE, MAXIMALLY PROBABLE, BATCH-MODE COMMERCIAL DETECTION FOR AUDIOVISUAL CONTENT filed Jul. 13, 2010 (now U.S. Pat. No. 8,630,536) which is a continuation of U.S. patent application Ser. No. 11/250,083, entitled ITERATIVE, MAXIMALLY PROBABLE, BATCH-MODE COMMERCIAL DETECTION FOR AUDIOVISUAL CONTENT filed Oct. 12, 2005 (now U.S. Pat. No. 7,778,519) which is incorporated herein by reference for all purposes, which is a continuation of U.S. patent application Ser. No. 09/715,901, entitled ITERATIVE, MAXIMALLY PROBABLE, BATCH-MODE COMMERCIAL DETECTION FOR AUDIOVISUAL CONTENT filed Nov. 18, 2000 (now U.S. Pat. No. 6,993,245) which is incorporated herein by reference for all purposes, which claims priority to U.S. Provisional Application No. 60/166,528, filed Nov. 18, 1999 which is incorporated herein by reference for all purposes.

TECHNICAL FIELD

This invention relates to determining the starting and ending times of commercial breaks, as well as the starting and ending times of commercials within those commercial breaks, in audiovisual content (e.g., a television broadcast).

BACKGROUND

There are a variety of previous approaches to detecting commercials in a television broadcast. However, previous approaches suffer from a flaw in that they act as relatively simple finite state machines with little or no error recovery. Previous approaches sometimes make an erroneous decision regarding a commercial location which only becomes apparent by considering data far ahead or after the commercial location in time. However, since previous approaches don't consider such data, information regarding the erroneous decision is ignored and the error remains uncorrected.

Merlino et al. of the MITRE corporation describe a multiple-cue-based method for segmenting news programs, including finding the commercial breaks. The Merlino et al. method uses black frames, audio silence and blank closed-captioning to find commercials, R. Lienhart et al. of the University of Mannheim also describe a multiple-cue-based system for detecting commercials. The Lienhart et al. method uses black frames, scene cuts and a measure of motion in a visual recording to detect commercials. The Informedia project at Carnegie-Mellon University used black frames, scene cuts and lapses in closed-captioning to detect commercials. Additionally, some VCRs come with commercial detection built in to the VCR. There are also a number of patents that describe methods for commercial detection, all of which use coincidences of black frames, audio silence and/or certain closed-captioning signals to detect commercials. For example, U.S. Pat. Nos. 4,319,286, 4,750,053, 4,390,904, 4,782,401 and 4,602,297 detect commercials based on these types of coincidences.

All of the previous approaches to commercial detection select commercial start or end times as the times at which some combination of cues, such as a black frame and an audio pause, coincide, with some optional restrictions. Typically, in previous approaches the decision as to whether or not a commercial starts at a particular time "t" is independent of the analogous decision for any other time in the audiovisual broadcast or recording. Previous approaches in which such complete independence does not exist use only a very limited dependence in which the decision at time "t" may be affected by whether or not a commercial was thought to start within some window of time [t–n, . . . , t] prior to the time "t". Thus, in previous approaches, a commercial detection decision made at any time "t" in a broadcast or recording is not affected by parts of the broadcast or recording following time "t" and only sometimes is affected by limited parts (less than one minute) of the broadcast or recording immediately prior to time "t". Further, none of the previous approaches have any sort of double-checking or error recovery; once a decision is made for time "t", by whatever heuristic the approach uses, the decision remains unchanged no matter what happens in the broadcast or recording after time "t" and no matter what other decisions are made before or after time "t". In summary, previous approaches to commercial detection make decisions as to commercial locations both time-locally and sequentially, i.e., only data from within a narrow time window about a particular time t is considered in making the decision as to whether a commercial starts or ends at that time t, and the decisions are made one at a time and are never reversed.

SUMMARY

In accordance with the invention, the starting and ending times of commercial breaks, as well as the starting and ending times of commercials within those commercial breaks, can be found in audiovisual content (e.g., a television broadcast) using a method having characteristics which overcome the above-described disadvantages of the prior art. The invention is implemented as a solution to a "batch optimization" problem in which commercial locations within a set of audiovisual content are detected as a group by choosing a set of commercial locations which optimizes a cost function which can include consideration of, for example, 1) one or more of many types of visual recording, audio recording and/or closed-captioning cues, 2) relative locations of commercials within the audiovisual content, and/or 3) probability models based on statistics obtained regarding characteristics of typical commercial and commercial breaks (e.g., commercial and commercial break duration, separation times of commercials and commercial breaks, likelihood of the presence of a commercial at any given time in a set of audiovisual content). Optimization can be done over the total set of commercial location decisions, rather than on a per-commercial basis. Additionally, the cost function can be iteratively evaluated, increasing the accuracy of commercial location decisions produced by the method. The logic for making decisions regarding detection of commercials in accordance with the invention is orders of magnitude more sophisticated than that of other approaches to commercial detection and produces correspondingly superior results. Additionally, many more types of information (cues) can be used in detection of commercials in accordance with the invention than have been used in other approaches to commercial detection.

The invention can make use of any one of a number of particular novel collections of cues to enable commercial detection. Previous approaches to commercial detection have used some of the cues that can be used in commercial detection according to the invention, but have not used all of the cues or collections of cues that can be used in accordance with the invention. Additionally, cues other than those specifically described herein can be used to enable commercial detection according to the invention.

Embodiments of the invention can have the following advantageous characteristics. The invention can be implemented so that commercial detection is performed iteratively. The invention can be implemented so that audiovisual content occurring before and/or after the time of a possible commercial is considered in deciding whether a commercial is present at that time. In particular, the invention can be implemented so that commercials are detected in a set of audiovisual content by considering all of that set of audiovisual content. The invention can be implemented so that the presence of multiple commercials in a set of audiovisual content can be detected at the same time. The invention can be implemented so that a decision regarding whether a commercial is detected at a particular location in a set of audiovisual content is dependent on the possible detection of one or more commercials at other location(s) in the set of audiovisual content. In particular, the invention can be implemented so that whether a commercial is detected at a particular location in a set of audiovisual content is dependent on all other possible detections of a commercial in the set of audiovisual content. Finally, as discussed above, the invention can be implemented so that commercial detection is based on the evaluation of a variety of novel cues or combinations of cues. Each of these aspects of the invention produce improved commercial detection results as compared to previous approaches to commercial detection.

The invention can be used for a wide variety of applications and purposes, as will be appreciated by those skilled in the art in view of the description herein. For example, commercial detection in accordance with the invention can be useful for enabling the observation of audiovisual content without commercial interruption, recording audiovisual content so that commercials are deleted from the recorded audiovisual content, searching for a particular commercial or a commercial of a particular type within audiovisual content, and customizing commercials in audiovisual content. Additionally, the invention can be used with, or implemented in, for example, conventional network television broadcasts, cable television broadcasts, television set-top boxes and digital VCRs.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
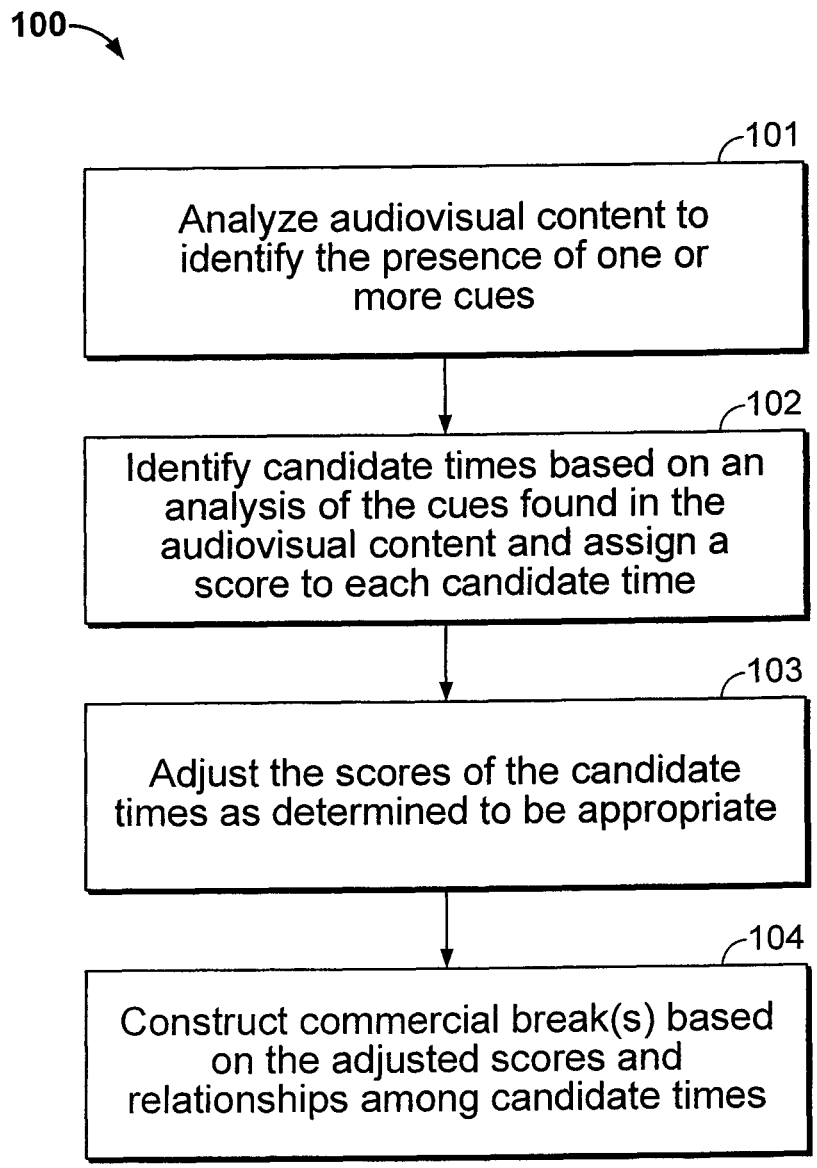
FIG. 1 is a flow chart of a method according to the invention.

FIG. 1 is a flow chart of a method 100 according to the invention for detecting one or more commercial breaks in a set of audiovisual content, each commercial break including one or more commercials. The method 100 identifies starting and ending times for each commercial break, as well as starting times for each commercial within a commercial break.

In step 101 of the method 100, the data representing the audiovisual content (including closed-captioning or other transcription data, if applicable) is analyzed to identify the presence of one or more predetermined types of cues. The location and duration of each cue (i.e., the beginning and ending times of each cue) can be determined. Other characteristics of the cues can be determined as well. Examples of the types of cues that can be identified are discussed in more detail below.

In step 102 of the method 100, the cues are analyzed to identify possible locations of commercial beginnings or endings (candidate times) within the audiovisual content. Examples of such analysis are discussed further below. A score is assigned to each candidate time, the score representing a probability that the candidate time is in fact a beginning or ending of a commercial.

In step 103 of the method 100, the scores associated with each candidate time are adjusted. The score for a candidate time can be adjusted, for example, based on an analysis of one or more cues proximate to the candidate time that are different than the one or more cues used to identify the candidate time. For instance, as described in more detail below with respect to step 206 of the method 200 (see FIG. 2) the score associated with a candidate time can be adjusted based on the presence or absence of one or more cues within a specified time window that includes the candidate time or to which the candidate time is sufficiently proximate (i.e., is less than a specified short amount of time, such as several seconds, before or after the time window). The score for a candidate time can also be adjusted, for example, based on an evaluation of the relationship between the candidate time and one or more other candidate times. In particular, as described in more detail below with respect to step 207 of the method 200 (see FIG. 2), this latter type of adjustment can make use of one or more probability models that describe expected relationship(s) between a candidate time and the one or more other candidate times.

The invention can be implemented so that after the adjustment of scores in step 103, scores below a specified threshold are eliminated. However, this need not necessarily be done.

In step 104 of the method 100, one or more commercial 30 breaks are constructed based on an evaluation of the adjusted scores of the candidate times and relationships among the candidate times. In particular, as described in more detail below with respect to step 208 of the method 200 (see FIG. 2), the evaluation of relationships among candidate times can make use of one or more probability models that describe expected relationship(s) between candidate times.

The method 100 can be implemented so that step 104 is iteratively performed. This can improve the identification of commercial breaks and individual commercials in a set of audiovisual content by enabling reconsideration of high-scoring candidate times which were not chosen as a commercial start or end time in an earlier performance of the step 104.

Figure 2:
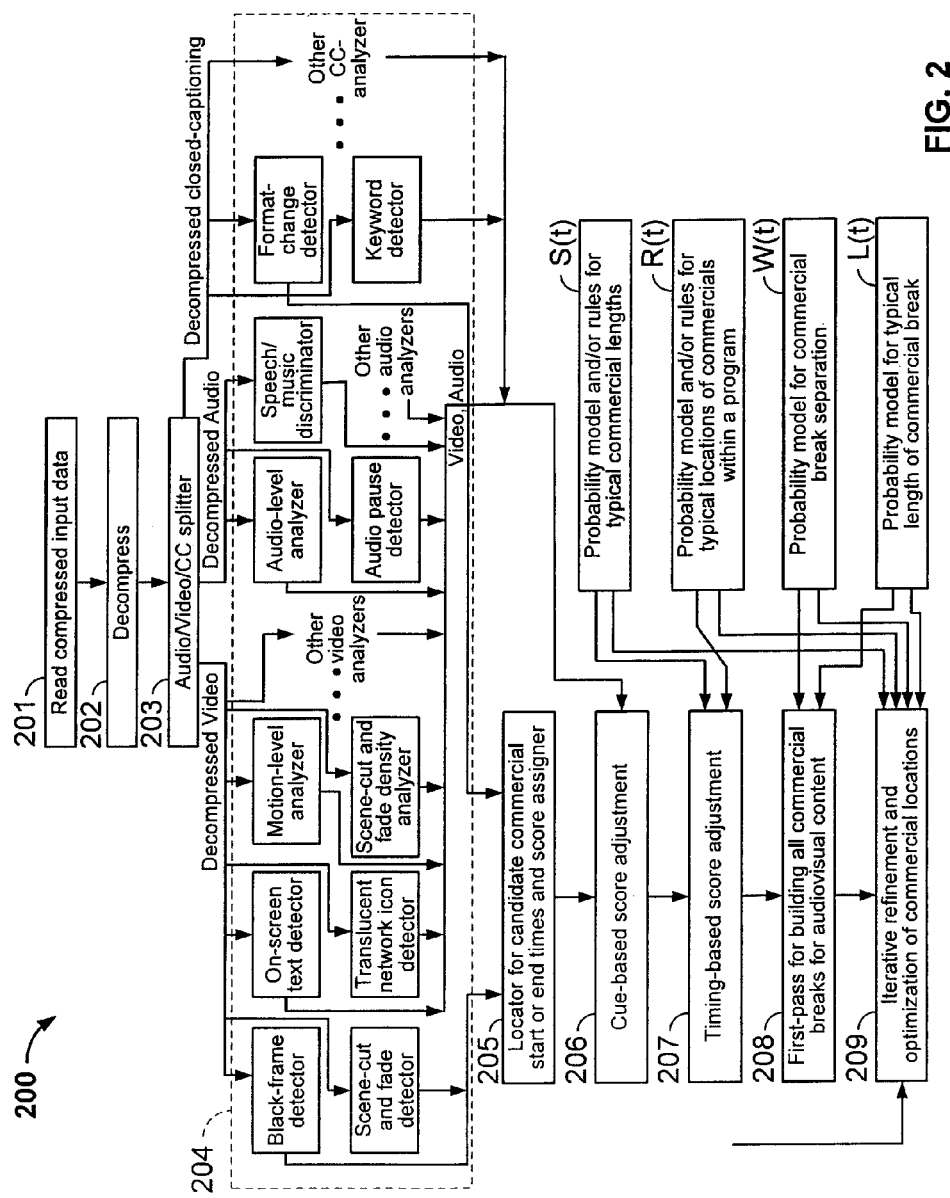
FIG. 2 is a flow chart of a method according to a particular embodiment of the invention.

FIG. 2 is a flow chart of a method 200, according to a particular embodiment of the invention, which can be implemented in a system, apparatus or computer program according to the invention to accomplish commercial detection in accordance with the invention. The data input to the method 200 represents audiovisual content (e.g., a television broadcast). Herein, "audiovisual content" includes one or both of visual data and audio data, and can also include closed-captioning data. In some embodiments of the invention, the input data is stored on a data storage medium or media, such as, for example, a computer hard disk (DRAM or SRAM), a CD-ROM, a DVD disk or a VHS tape. As described below, in other embodiments of the invention, the input data can represent live (i.e., not stored) audiovisual content (e.g., a live television broadcast) that is acquired in real time. As shown in FIG. 2, the input data is compressed, however this need not necessarily be the case.

The output of the method 200 is a list of commercial break start and end times within the audiovisual content, plus lists of the individual commercial start times (and, therefore, implicitly, the individual commercial end times) within each commercial break. The identification of the start and end times of commercial breaks and individual commercials in the audiovisual content can be used to, for example, enable editing of the audiovisual content. For instance, the detected commercials can be deleted from the audiovisual content or the commercials can be altered in a desired manner. (The modified data, e.g., data representing commercial-less audiovisual content, can be stored on a data storage medium or media). However, a method according to the invention need not be used to edit the audiovisual content within which the commercial breaks and individual commercials have been detected.

In the first step of the method 200, step 201, the input data is identified as the input data is input to the method 200 (e.g., read from a data storage medium or media). Apparatus for effecting such identification is known to those skilled in the art and will depend on the source of the input data. For example, readers for all useful data storage media are readily available.

The next step of the method 200, step 202, is to decompress the raw data, if necessary. The invention does not require the original input data to be in compressed format, nor does the invention require the input data to be in uncompressed format. However, if the input data is in compressed format, the implementation of the invention illustrated in FIG. 2 requires a decompression mechanism. The precise form of the decompression mechanism depends on the compression format, but decompression mechanisms for all useful forms of compression formats are readily available.

In step 203 of the method 200, the decompressed data is split into visual, audio and closed-captioning subcomponents. (As indicated above, one or two of visual, audio and closed captioning data may not be present as part of the input data.) The precise form of the mechanism for splitting apart the input data can depend on the decompression mechanism used, but such data-splitting mechanisms are readily available for any useful compression format.

In step 204, the audiovisual content is evaluated to identify the presence of one or more cues in the audiovisual content. Each data subcomponent produced by step 203 is input into one or more analyzers. The analyzer(s) identify the location(s) and duration(s) of cue(s) within the audiovisual content. In particular, the presence of cue(s) throughout an entire set of audiovisual content can be identified. The analyzers may also identify other characteristics of the cue(s). The following is an exemplary list of characteristics of a set of audiovisual content regarding which cues can be identified within the set of audiovisual content: 1) an audio pause (i.e., a period of silence or near silence) in the audio content, 2) a sequence of black frames in the visual content, 3) a scene cut or fade in the visual content, 4) a significant (i.e., greater than a specified amount) change in average volume in the audio content, 5) the presence of music in the audio content, 6) speaker identity, 7) the "density" of scene breaks (cuts) or fades in the visual content (i.e., the number of scene breaks and/or scene fades during a specified time window divided by the duration of the time window), 8) the absence of a usually present network icon (whose shape and color characteristics can be learned automatically by appropriately analyzing a region, e.g., a region, such as a corner, near the edge of the visual content, of the visual content in which a network icon is expected to be present, 9) the degree of motion in a period of visual content, 10) the presence of text in the visual content, 11) the occurrence of specified closed-captioning formatting signals, and 12) the absence of closed-captioning. Suitable methods for identifying each of the above-listed cues have been published in various academic journals, industry journals and conference proceedings, and are known to those skilled in the art. As will be appreciated by those skilled in the art in view of the description herein, other cues not listed above can also be used, alone or in combination with each other and/or one or more of the above listed cues to enable commercial detection according to the invention. The specific methods used to identify the above listed or other cues may affect the overall performance of a system or method according to the invention, but, in general, any such methods can be used with the invention. However, it is an advantageous aspect of the invention that the invention enables use of a combination of the above-listed cues to effect commercial detection.

In an alternative implementation of the invention, the output from step 201 of the method 200 would be input directly to some or all of the analysis engines of step 204. That is, some of the analysis engines can be made to operate directly on the compressed data, depending on the compression format. For example, the black-frame detection, scene-cut detection, motion analysis and audio-level change detection can all operate directly on data that has been compressed in the MPEG-1 or MPEG-2 format.

In step 205 of the method 200, one or more of the cues identified in step 204 are analyzed to identify candidate times within the audiovisual content at which a commercial beginning or a commercial ending may occur. For example, an audio pause often accompanies either the beginning or the end of a commercial, so the presence of an audio pause in the audio content can be identified as a factor that militates toward establishing a candidate time at some time during or proximate to the audio pause. Similarly, a sequence of black frames often accompanies either the beginning or the end of a commercial, so the presence of a sequence of black frames in the visual content can be identified as a factor that militates toward establishing a candidate time at some time during or proximate to the sequence of black frames. A scene cut or fade also typically accompanies the beginning or the end of a commercial, so the presence of a scene break or fade in the visual content can be identified as a factor that militates toward establishing a candidate time at some time during or proximate to the scene break or fade. The beginning and end of a commercial break are often accompanied by a noticeable increase and decrease in volume, respectively, so that a significant change in average volume (measured over a specified window of time) can be identified as a factor that militates toward establishing a candidate time at some time proximate to times at which the volume is seen to change significantly. Commercials often include relatively more musical content than the rest of a set of audiovisual content, so the occurrence of a time window of specified duration (e.g., the expected duration of a typical commercial break, such as 60 seconds, or the expected duration of a typical commercial, such as 15 or 30 seconds) having relatively high musical content (e.g., relatively high density of musical content relative to the density of musical content in other, proximate time windows) can be identified as a factor that militates toward establishing candidate times at the beginning and end of such a time window. The beginning or end of a commercial is often accompanied by a change in speaker identity, so the occurrence of a change in speaker identity can be identified as a factor that militates toward establishing a candidate time at, or proximate to, the time at which such a change in speaker identity occurs. A commercial break often includes a relatively high density of scene breaks and/or fades (since a scene break or fade typically occurs at the beginning and end of a commercial break, as well as at the transition between commercials within a commercial break, and since commercials often include a relatively large number of scene breaks and/or fades per unit time within the commercial), so the occurrence of a time window of a specified duration (e.g., 60 seconds) during which the density of scene breaks and/or scene fades is relatively high (i.e., exceeds a specified threshold), or a significant change in density of scene breaks and/or scene fades over one window of time with respect to a proximate window of time, can be identified as a factor that militates toward establishing candidate times at the beginning and end of such a time window. A network icon is sometimes present during the noncommercial parts of a television broadcast; therefore, if a network icon is determined to be present in a set of audiovisual content, the disappearance of the network icon typically accompanies the beginning of a commercial break and the appearance of the network icon typically accompanies the end of a commercial break, so the appearance or disappearance of a network icon can be identified as a factor that militates toward establishing a candidate time at, or proximate to, a time at which the network icon appears or disappears. Since the average motion level in the visual content of a commercial is often significantly different than the average motion level of other visual content in a set of audiovisual content, significant change in the amount of motion in the visual content of a time window (e.g., about 60 seconds) relative to the amount of motion in the visual content in a proximate time window can be identified as a factor that militates toward establishing candidate times at, or proximate to, the beginning and end of such a time window. The appearance of text (other than closed-captioning) in a set of audiovisual content often accompanies the beginning of a commercial break and the disappearance of text often accompanies the end of a commercial break, so the appearance or disappearance in a set of audiovisual content of text other than closed-captioning can be identified as a factor that militates toward establishing a candidate time at, or proximate to, a time at which text appears or disappears. If closed-captioning data is present in the data representing the audiovisual content, a closed-captioning scrolling format change often occurs at the beginning or the end of a commercial break, so the occurrence of a closed-captioning scrolling format change can be identified as a factor that militates toward establishing a candidate time at, or proximate to, the time at which such a format change occurs. If closed-captioning data is present in the data representing the audiovisual content, the disappearance of closed-captioning often accompanies the beginning of a commercial break and the appearance of closed-captioning often accompanies the end of a commercial break, so the appearance or disappearance of closed-captioning can be identified as a factor that militates toward establishing a candidate time at, or proximate to, a time at which closed-captioning appears or disappears.

As indicated above, it is an advantageous aspect of the invention that the invention enables use of a combination of the cues to effect commercial detection. In particular, the invention can enable the use of cues and combinations of cues that have not previously been used for commercial detection. For example, the invention can advantageously enable any one of detection of the absence of a network icon, an analysis of musical content present in a set of audiovisual content, the density of scene breaks and/or fades, or analysis of the identity of speakers of spoken content to be used alone as a commercial detection cue. These cues can also be used in any combination with each other or any other cue. In particular, it is anticipated that one or more of these cues can advantageously be used in combination with one or more of the following cues: 1) the occurrence of an audio pause, 2) the occurrence of a sequence of black frames, 3) a scene cut or fade, 4) the occurrence of specified closed-captioning formatting signals, and 5) the appearance or disappearance of closed-captioning.

Step 205 outputs a list of candidate times at which commercials may be beginning or ending, together with a score or probability associated with each candidate time. In one implementation of the invention, each candidate time is assigned the same initial score. Alternatively, the scores assigned to candidate times can vary. For example, the score for a candidate time can depend on which cue(s) were used to identify the candidate time. The beginning or end of a commercial can be deduced from the presence of some cues with a greater degree of confidence than that associated with the presence of other cues. To the extent that a candidate time is identified based on a cue with which a relatively high degree of predictive confidence is associated, the score assigned to that candidate time can be relatively higher than would be the case if a relatively low degree of predictive confidence was associated with the cue. Additionally, the score for each candidate time can be dependent on how strongly the cue is present in the audiovisual content, as determined in accordance with a criterion or criteria appropriate for that cue: the more strongly a cue is present, the higher the score. For example, when one of the cues used to establish a candidate time is an audio pause, the score established for the candidate time can be dependent on the duration of the audio pause and/or the degree of silence during the audio pause (e.g., the score for the candidate time is made relatively greater the longer the audio pause or the less sound that is present during the audio pause). Or, for example, when one of the cues used to establish a candidate time is a sequence of black frames, the score established for the candidate time can be dependent on the duration of the sequence of black frames and/or the completeness of the blackness of the frames (e.g., the score for the candidate time is made relatively greater the longer or blacker the sequence of black frames). Or, for example, when one of the cues used to establish a candidate time is a scene cut, the score established for the candidate time can be dependent on the number of pixels that changed by more than a threshold amount from one frame to another (e.g., the score for the candidate time is made relatively greater as more pixels changed between scenes) and/or dependent on the total change of all the pixels from one frame to another (where the "change" for each pixel is the change in the color or other components of a pixel). Or, for example, when one of the cues used to establish a candidate time is a significant average audio volume change, the score established for the candidate time can be dependent on degree of the volume change (e.g., the score for the candidate time is made relatively greater as degree of the volume change increases). Those skilled in the art can readily appreciate how the score for a candidate time can be adjusted based on aspects of other cues present in the audiovisual content proximate to the candidate time. Additionally, the score for a candidate time can be dependent on the confidence level associated with identification of the cue in the audiovisual content: the greater the confidence level, the higher the score. (This confidence level is different than the confidence level associated with the predictive capability of the cue, discussed above.) For example, sound represented in audio data may be sound in the audio content or noise. The score for a candidate time identified at least in part based on the presence of an audio pause can be increased or decreased in accordance with extent to which the degree of noise present in the audio data increases or decreases the confidence with which an audio pause can be detected.

In step 206 of the method 200, the scores associated with each candidate time can be adjusted based on the presence or absence of one or more cues within some time window proximate to the candidate time. The cue(s) used to adjust the score of a candidate time in step 206 are different than the cue(s) used to establish the candidate time and an initial associated score in step 205. The duration of the time window and location of the time window with respect to the cue is dependent on the type of cue. For instance, the score for a candidate time is increased (i.e., the likelihood that the candidate time correctly indicates the beginning or ending of a commercial is deemed to increase) in each of the following cases: 1) the candidate time is coincident with the time at which an audio pause (which is a window of audio silence or near silence) occurs, 2) the candidate time is within or sufficiently proximate to a time window in which the closed-captioning scrolling format is different from that which is typical for audiovisual content of this type, 3) the candidate time is within or sufficiently proximate to a time window during which closed-captioning is absent (for audiovisual content that is known to be closed-captioned), 4) the candidate time is within or sufficiently proximate to a time window of at least a specified duration (e.g., 60 seconds) and including high musical content, 5) the candidate time is within or sufficiently proximate to a time window during which the density of scene breaks and/or scene fades exceeds a specified threshold, 6) the candidate time is sufficiently proximate to a time window of at least a specified duration (e.g., 0.5 seconds) and in which the average motion in the visual content, measured in a specified manner, is less than a specified threshold, 7) the candidate time is within a time window during which a network icon (which has been found to be persistent through a majority of the visual content) is not present at a specified location within the visual content (e.g., a region, such as a corner, near the edge of the visual content), 8) the candidate time is very near (e.g., within about 2 seconds) a time at which the time-averaged audio volume (averaged over a time window of about 10 seconds) has changed by a magnitude of greater than a specified threshold, 9) the candidate time is sufficiently proximate to (within about 1 second) a time when text is present in the visual content, 10) the candidate time is within a specified duration of time (e-g., a few seconds) after the presence in the closed-captioning stream of certain keywords or phrases such as "commercial", "break", "coming up" or "after", or within a specified duration of time (e.g., a few seconds) prior to the presence in the closed-captioning stream of certain keywords or phrases such as "welcome", "hello" or "we're back, 11) the candidate time is within a specified duration of time (e.g., 2 seconds) from a time at which the speaker identity has changed, and 12) the candidate time is within a specified duration of time (e.g., one to several seconds) from a time window of greater than a specified duration (e-g., 1 minute) that does not include speech from a speaker whose speech has been determined to be present in the audiovisual content with greater than a specified frequency. The amount by which a score is adjusted can be dependent on the same types of analyses done to establish an initial score for a candidate time, as described above with respect to step 205. (However, the particular analyses done in step 206 need not, but can be, the same as those done in step 205.) In particular, the amount of the adjustment to a score for a candidate time can be dependent on how strongly the cue is present in the audiovisual content, as determined in accordance with a criterion or criteria appropriate for that cue: in general, the more strongly a cue is present, the greater the adjustment to the score. Additionally, the amount of the adjustment to a score for a candidate time can be dependent on how high or low the score is prior to the adjustment. For example, a cue that strongly indicates the presence of a commercial beginning or ending may cause a larger adjustment in a relatively low score than in a relatively high score. The particular quantities, keywords, and other algorithm parameters given above are illustrative; they may be changed, within appropriate constraints, as can be appreciated by those skilled in the art, without adversely affecting the operation of the invention.

In step 207 of the method 200, the scores associated with each candidate time are further adjusted based on one or more probability models of characteristic(s) of the occurrence of commercials and/or commercial breaks within audiovisual content. For example, the scores of the candidate times can be adjusted based on a probability model of the time-separation of commercial start and end times. The scores of the candidate times can also be adjusted based on a probability model of the typical locations of commercial breaks within audiovisual content. Such a probability model can be constructed by collecting statistics regarding the relevant characteristic(s) across many sets of audiovisual content of a variety of different types, in order to produce a generic probability model that applies to all types of audiovisual content. Such a probability model can also be made specific to a particular type or types of audiovisual content (including a particular audiovisual program) by only combining statistics across audiovisual content of those type(s). This can be desirable to increase the accuracy obtained when the probability model is used to aid in detection of commercials in audiovisual content of those type(s). Finally, such a probability model can be constructed manually based on the intuition of the implementer of the model as to the characteristic being modeled (e.g., how long commercials typically last or when commercial breaks tend to occur in given audiovisual content). However constructed, the probability model(s) can be represented as functions of time, as described below.

Figure 3A:
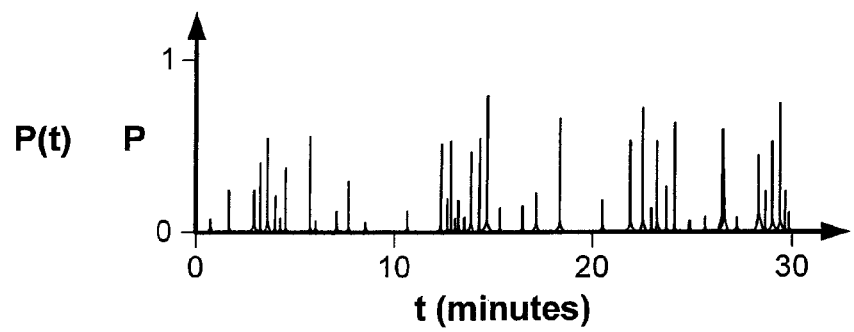
FIG. 3A is a graph of an example of a function P(t) which indicates the likelihood that a commercial starts or ends at each time during a set of audiovisual content.

In step 207, one or more probability models can be applied to the list of score-adjusted candidate times generated by step 206 to further adjust the scores of the candidate times. The list of score-adjusted candidate times generated by step 206 is first represented as a function of time, P(t), which indicates the likelihood that a commercial starts or ends at each time during the audiovisual content. For all candidate times, P(t) can be made equal to the adjusted score associated with that candidate time (perhaps normalized by the total of all the adjusted scores), while for all other times P(t) can be made equal to zero. FIG. 3A is a graph of an example of a function P(t).

Figure 3B:
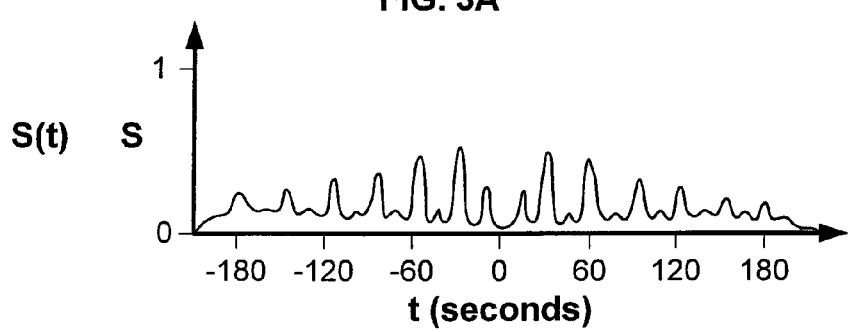
FIG. 3B is a graph of an example of a function S(t) which represents a probability model of the likely location, relative to a particular commercial start or end time, of other commercial start or end times.

A function S(t) is determined, representing a probability model of the likely location, relative to a particular commercial start or end time, of other commercial start or end times. The function S(t) can be particularized to be representative of a particular type or types of audiovisual content. For example, for American television programs, the function S(t) will have peaks around +/−30 seconds, +/−60 seconds and +/−15 seconds. FIG. 3B is a graph of an example of a function S(t).

Figure 3C:
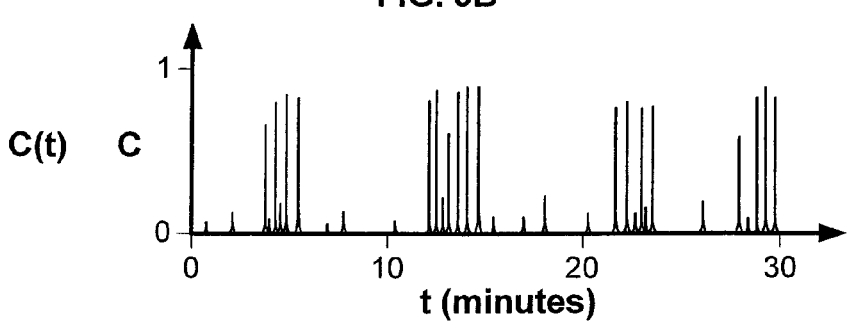
FIG. 3C is a graph of a function C(t) produced by convolving the function P(t) of FIG. 3A with the function S(t) of FIG. 3B.

P(t) is convolved with S(t) to produce a function C(t). The value of C(t) will be very high at times at which a high value of P(t) is separated from other times having a high value of P(t) by time durations S(t) having a high value. In other words, C(t) will be very large at values of t which are high-scoring candidate times and where there are other high-scoring candidate times before and/or after t by an amount of time corresponding to a typical commercial duration (e.g., 30 seconds). FIG. 3C is a graph of a function C(t) produced by convolving the function P(t) of FIG. 3A with the function S(t) of FIG. 3B.

Figure 3D:
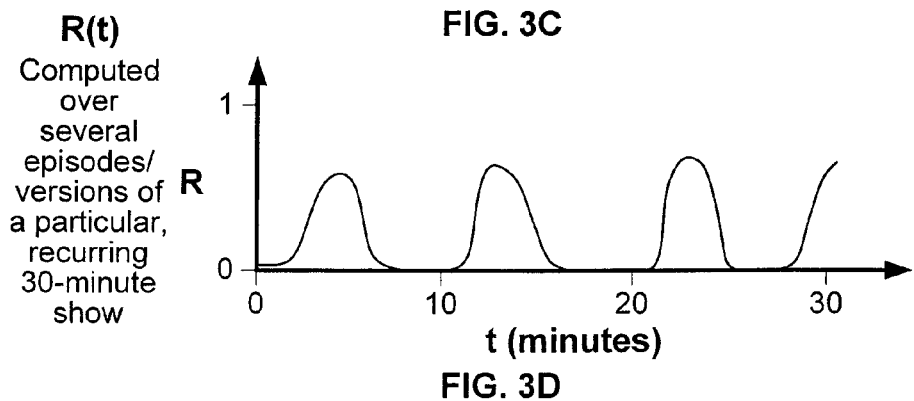
FIG. 3D is a graph of an example of a function R(t) which represents a probability model of the likelihood, at all times within a set of audiovisual content, that a commercial is in progress.

A function R(t) is determined, representing a probability model of the likelihood, at all times within a set of audiovisual content, that a commercial is in progress. If the probability model is restricted to be based on a particular class of well-defined sets of audiovisual content (e.g., the different versions of a particular recurring audiovisual program) and if commercials tend to be placed at approximately the same times in each such set of audiovisual content, then the probability model will have well-defined zones during which the probability of a commercial being in progress is high. On the other hand, if the audiovisual content on which the probability model is based is not restricted at all, so that the probability model is learned across all types of audiovisual content, the probability model will likely be close to a uniform distribution (a flat function), which is not very useful. Therefore, it is desirable to restrict the audiovisual content on which the probability model is based. In particular, it is desirable to base the probability model which the function R(t) represents on audiovisual content which is similar to that in which commercials are to be detected. FIG. 3D is a graph of an example of a function R(t).

Figure 3E:
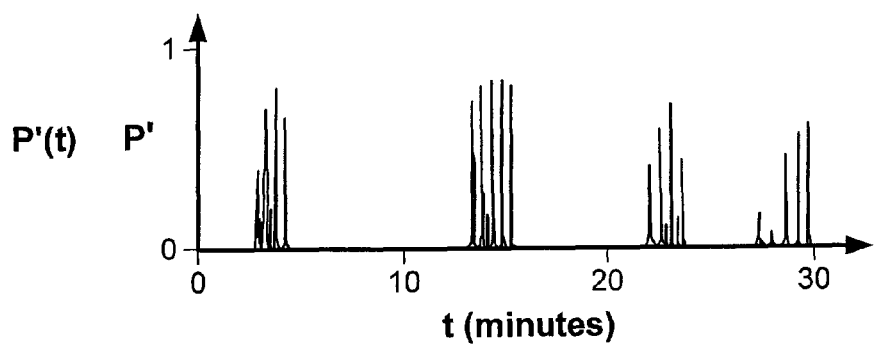
FIG. 3E is a graph of a function P'(t) produced by pointwise multiplying the function C(t) of FIG. 3C by the function R(t) of FIG. 3D.

As indicated above, step 207 begins by convolving the function P(t) with the function S(t) to produce the function C(t). The function C(t) is then point-wise multiplied by the function R(t) to produce a function P'(t). FIG. 3E is a graph of a function P'(t) produced by point-wise multiplying the function C(t) of FIG. 3C by the function R(t) of FIG. 3D. The function P'(t) is resampled at the candidate times: these samples represent further adjusted scores for the candidate times.

The method 200 is described above as including both score adjustments of the type described in step 206 and score adjustments of the type described in step 207. However, the method 200 could be implemented with only one of those types of score adjustments, i.e., the method 200 could include only one of steps 206 and 207.

After the adjustment of scores in step 207, optionally, scores below a specified threshold can be eliminated.

Figure 3F:
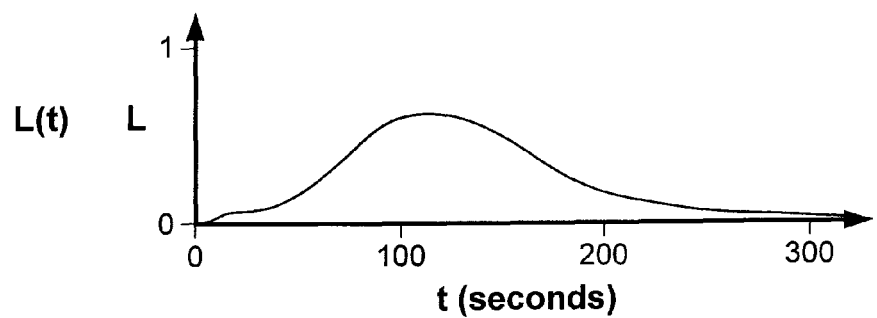
FIG. 3F is a graph of an example of a function L(t) which represents a probability model of the typical duration of a commercial break.
Figure 3G:
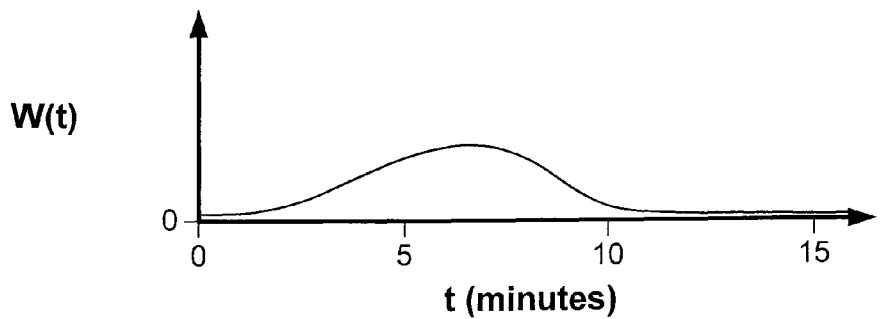
FIG. 3G is a graph of an example of a function W(t) which represents a probability model of the typical time separation between commercial breaks in a set of audiovisual content.

In step 208 of the method 200, the candidate times and associated adjusted scores are evaluated, and starting and ending times for commercial breaks and individual commercials within those commercial breaks are identified based on that evaluation. Two additional probability models (which can be represented as functions of time) are used in this evaluation: 1) a function L(t), which represents a probability model of the typical duration of a commercial break, and 2) a function W(t), which represents a probability model of the typical time separation between commercial breaks. Each of these probability models, as the probability models discussed above with respect to step 207, can be constructed based on statistics collected across many types of audiovisual content or across only a particular type or types of audiovisual content, or can be constructed based on the intuition of the implementer of the model regarding the characteristic being modeled. FIG. 3F is a graph of an example of a function L(t) and FIG. 3G is a graph of an example of a function W(t).

Step 208 begins by selecting the candidate time with the highest score to be a commercial start or end time (whether that time is a start time or end time is unknown at this point). A commercial break is then constructed based on the selected candidate time by successively evaluating candidate times in order of decreasing score and adding candidate times to the commercial break that satisfy each of the following criteria: 1) the additional candidate time is well-spaced in time, in accordance with the function S(t), from each candidate time that has already been included in the commercial break, 2) the additional candidate time does not create a commercial break which is too long, in accordance with the function L(t), and 3) the additional candidate time is not too close to other existing commercial breaks, in accordance with the function W(t), that have already been identified by the step 208. Stated another way, candidate times continue to be added to a commercial break in order of score as long as there are any candidate times for which all of the following are true: 1) the value of S(t), where "t" is the time separation between the candidate time being evaluated and a candidate time already included in the commercial break, is above a specified threshold value for each candidate time already included in the commercial break, 2) the value of L(t), where "t" is the duration of the commercial break if the candidate time is added to the commercial break, is not below a specified threshold value, and 3) the value of W(t), where "t" is the time separation between the candidate time and an existing commercial break, is not below a specified threshold value for each existing commercial break.

Once no more candidate times can be added to the commercial break currently being constructed, step 208 attempts to find a new candidate time around which to construct a new commercial break. The candidate time with the highest score above a specified threshold that is not currently part of any commercial break, and that is separated from all existing commercial breaks by a time "t" for which W(t) is above a specified threshold, is selected as a new candidate time upon which to base the construction of a new commercial break. If such a candidate time is identified, then the construction of a commercial break proceeds as described above. If no such candidate time can be identified, then step 208 terminates. The output of step 208 is a list of commercial break start and end times, and lists of start times of individual commercials within each commercial break.

Finally, step 209 of the method 200 causes the set of decisions made in step 208 regarding start and end times of commercial breaks and commercials to be iteratively refined and optimized. Step 209 attempts to account for other high-scoring candidate times which may occur in or near a previously identified commercial break, but which have not yet been chosen as a commercial start or end time. In step 209, the following procedure is performed for each candidate time which has not yet been selected as a commercial start or end time and for which Pt(t) has a magnitude above a specified threshold value.

First, the candidate time is added to the most temporally proximate commercial break, provided that the candidate time would not cause that commercial break to become too long (i.e., the value of L(t), where "t" is the duration of the commercial break if the candidate time is added to the commercial break, is not below a specified threshold value) and would not cause that commercial break to be too close to another commercial break (i.e., the value of W(t), where "t" is the time separation between the candidate time and an existing commercial break, is not below a specified threshold value for each existing commercial break).

Next, additional candidate times that are not part of the commercial break to which a candidate time has just been added are evaluated according to the same criteria, described above, that were used to construct the commercial break in the first place. That is, the probability models S(t), L(t), and W(t) are all considered as described above.

The new commercial break may have too many candidate times within it. Thus, an attempt is made to remove candidate times that are located too closely together. For each candidate time of the commercial break, a computation is made of the average S(t) for the time separation between the candidate time and the two adjacent candidate times. If the average is below a specified threshold, then it may be that either the candidate time or the adjacent candidate times are not accurate commercial start or end times. If the P'(t) score of the candidate time is lower than the average P'(t) of the two adjacent candidate times, the candidate time is eliminated from the commercial break. Otherwise, any of the two adjacent candidate times that are within a specified small time separation (e.g., 25 seconds) of the candidate time are eliminated from the commercial break.

Finally, after the addition(s) and elimination(s) of candidate times have been made, a new average score is calculated for the candidate times of the commercial break. If the average score is higher than the average score for the candidate times of the commercial break before changes were made in step 209, the changes are kept. Otherwise, the changes are discarded and the candidate times of the commercial break revert back to the candidate times before the addition(s) and elimination(s) made in step 209.

After an attempt has been made to include each of the candidate times for which P'(t) is above a threshold, a check is made to see if any of these candidate times were in fact included in a commercial break. If none were, then step 209 terminates and outputs the final determination(s) of the method 200 regarding the start and end times of commercial breaks and individual commercials in the audiovisual content. If any of these candidate times were included in a commercial break, then step 209 is repeated: for each candidate time having a score P'(t) above a specified threshold, an attempt is made to add that candidate time to the nearest commercial break. Many iterations of step 209 may be required before a stable solution is produced (i.e., further changes are not made to the determined start and end times of commercial breaks and individual commercials in the audiovisual content).

The invention as described above can be modified slightly in order to operate on audiovisual content that is being received live via a tuner, cable or other means, and to produce commercial detection results with minimal delay relative to the current live position within the audiovisual content. If the cue(s) are not transmitted with the data representing the audiovisual content, to accomplish this, the invention is implemented to enable the analysis of the audiovisual content to identify the presence of cues (the invention can be implemented to identify one, some or all of the cues described above with respect to step 204 of the method 200 of FIG. 2) at a rate that is at least as fast as the rate at which the data representing the audiovisual content is being received. The invention is further implemented so that this can be done while receiving the transmission of the data representing the audiovisual content. The invention is implemented to evaluate lists of identified cues over a window from the present time "t" back to a time "T" seconds into the past. If the computations done in steps 205 through 209 of the method 200 of FIG. 2 (or comparable steps of another method according to the invention, such as the steps 102 through 104 of the method 100 of FIG. 1) can be done in N seconds, a new set of commercial location estimates up to the current time "t" minus approximately N seconds can be produced. This can be done every N seconds. For instance, if N=0.5 seconds, the commercial locations up to the current time with 0.5 seconds delay can be computed and this can be done every 0.5 seconds. This would be sufficiently fast for commercial detection applications that require actions to be taken in roughly "real-time," e.g., changing the channel or stopping recording when a commercial begins. The accuracy of such an embodiment of the invention may not be as high as for an embodiment that operates on audiovisual content that is stored in its entirety, since, in the latter case, information beyond time "t" can be used to improve the commercial detection decision at time "t".

The invention can be implemented entirely in software, entirely in hardware (e.g., using DSPs and/or special purpose ASICs) or in a combination of the two. Firmware can also be used to implement some part or all of the invention.

The invention can be used for a wide variety of applications, as can be appreciated by those skilled in the art in view of the description herein. In general, the invention can be used with any broadcast or other data transmission over a network (e.g., conventional network television broadcasts, cable television broadcasts, broadcasts or transmissions over a computer network such as the Internet—and, in particular, the World Wide Web portion of the Internet). Additionally, the invention can be used generally to detect commercials in audiovisual content represented by any type of data, which data can be stored on a data storage medium or media, or provided to a system or method according to the invention in real time. Further, the invention can be implemented in a wide variety of apparatus, as can also be appreciated by those skilled in the art in view of the description herein, such as, for example, television set-top boxes, digital VCRs, computers (including desktop, portable or handheld computers) or any of a variety of other computational devices (including many which are now being, or will in the future be, developed).

Various embodiments of the invention have been described. The descriptions are intended to be illustrative, not limitative. Thus, it will be apparent to one skilled in the art that certain modifications may be made to the invention as described herein without departing from the scope of the claims set out below.

Although the foregoing embodiments have been described in some detail for purposes of clarity of understanding, the invention is not limited to the details provided. There are many alternative ways of implementing the invention. The disclosed embodiments are illustrative and not restrictive.

I claim:

1. A method for detecting boundary times for at least one commercial break in a set of audiovisual content, the method comprising:
    selecting a current set of commercial boundary times,
        wherein the current set of commercial boundary times includes multiple possible commercial boundary times within a duration of time spanned by the set of audiovisual content;
    forming a revised set of commercial boundary times,
        wherein the revised set of commercial boundary times includes the current set of commercial boundary times and at least one additional time within the duration of time spanned by the set of audiovisual content;
    compare, based on probabilities, the revised set of commercial boundary times and the current set of commercial boundary times,
        wherein the comparing is to determine whether the revised set of commercial boundary times is a better set of commercial boundary times than the current set of commercial boundary times, and
        wherein the comparing is performed on processing circuitry and includes comparing values associated with commercial boundary times in the revised set of commercial boundary times and the current set of commercial boundary times; and
    designating the revised set of commercial boundary times as the current set of commercial boundary times.

2. The method as in claim 1, wherein the step of comparing further comprises:
    identifying a candidate time within the current set of commercial boundary times, wherein the candidate time represents a possible boundary time of a commercial in the current set of commercial boundary times; and
    assigning an initial value to the candidate time based on an evaluation of the candidate time to determine a likelihood that the candidate time is a commercial boundary time.

3. The method of claim 2, wherein the candidate time is identified based on the detection of one more predetermined cues in a first set of cues and wherein the evaluation is based on the one or more predetermined cues used to detect the candidate time.

4. The method of claim 2, wherein the initial value associated with the candidate time is adjusted based on one or more predetermined cues in a second set of cues occurring within a time interval proximate to the candidate time.

5. The method as in claim 2, wherein the at least one additional commercial boundary time within the revised set of commercial boundary times is identified as a candidate time.

6. The method of claim 1, wherein the values are based at least in part on an evaluation of one or more characteristics of audiovisual content occurring within the duration of time spanned by the audiovisual content.

7. The method of claim 1, wherein the values are based at least in part on an evaluation of one or more characteristics of audiovisual content occurring before the candidate time or after the candidate time.

8. The method as in claim 1, wherein the value is adjusted based on a relationship of the candidate time to all other candidate times within the duration of time spanning the set of audiovisual content.

9. The method as in claim 1, wherein the method is iterative.

10. A system for detecting at least one commercial in a set of audiovisual content, the system comprising:
    an interface for receiving data including the set of audiovisual content;
    at least one processor capable of executing instructions
        select a current set of commercial boundary times in the set of audiovisual content,
            wherein the current set of commercial boundary times include candidate times identified within a duration of time spanned by the audiovisual content;
        form a revised set of commercial boundary times,
            wherein the revised set of commercial boundary times include the current set of commercial boundary times and at least one additional candidate time within the duration of time spanned by the audiovisual content;
        analyze the revised set of commercial boundary times and the current set of commercial boundary times to determine whether the revised set of commercial boundary times is more probable to include as a commercial boundary time than the current set of commercial boundary times set,
            wherein the analysis includes comparing values assigned to candidate times in the revised set of commercial boundary times and the current set of commercial boundary times, and
            wherein the values are associated with probabilities related to the candidate times; and
        designate the revised set of commercial boundary times as the current set of commercial boundary times.

11. The system of claim 10, wherein the at least one processor is further configured to detect one or more predetermined cues in a first set of cues within the duration of time spanned by the audiovisual content, wherein a candidate time is identified based on the one or more predetermined cues, and wherein a value assigned to the candidates times is based at least in part on the one or more predetermined cues used to identify that candidate time.

12. The system of claim 10, wherein the values assigned to the candidates times are adjusted based on one or more predetermined cues in a second set of cues.

13. The system of claim 10, wherein the at least one processor is configured to decompress data received at the interface.

14. The system of claim 10, further comprising a data storage medium configured to store the data including the set of audiovisual content.

15. The system of claim 10, wherein the data includes any one or more of audio data, visual data, and closed-captioning data.

16. The system of claim 10, wherein the data including the set of audiovisual content is live.

17. A non-transitory computer-readable medium encoded with computer-readable instructions that when performed by a processor perform a method for detecting a commercial in a set of audiovisual content, the method comprising:

selecting a current set of commercial boundary times,
        wherein the current set of commercial boundary times includes multiple possible commercial boundary times within a duration of time spanned by the set of audiovisual content;
    forming a revised set of commercial boundary times,
        wherein the revised set of commercial boundary times include the current set of commercial boundary times and at least one additional time within the duration of time spanned by the set of audiovisual content;
    analyzing the revised set of commercial boundary times and the current set of commercial boundary times,
        wherein the analysis includes comparing scores associated with commercial boundary times in the revised set of commercial boundary times and the current set of commercial boundary times, and
        wherein the scores are associated with probabilities related to the commercial boundary times; and
    designating the revised set of commercial boundary times as the current set of commercial boundary times.

18. The computer-readable medium as in claim 17, wherein the method further comprises:

identifying candidate times within the duration of time spanned by the set of audiovisual content, wherein the candidate times are identified based on the detection of one or more predetermined cues; and
    assigning a score with the candidate time based on an evaluation of the candidate time to determine a likelihood that the candidate time is a commercial boundary time, wherein the candidate time represents a possible commercial boundary time in the set of audiovisual content.

19. The computer-readable medium as in claim 17, wherein the analyzing includes determining whether the revised set of commercial boundary times or the current set of commercial boundary times is more probable to include as a commercial boundary time, and wherein the score for the candidate time is dependent on a confidence level associated with each of the one or more predetermined cues used to identify the candidate time.

\* \* \* \* \*

UNITED STATES PATENT AND TRADEMARK OFFICE
CERTIFICATE OF CORRECTION

PATENT NO.        : 8,995,820 B2                              Page 1 of 1
APPLICATION NO.   : 14/154999
DATED             : March 31, 2015
INVENTOR(S)       : Michael L. Harville It is certified that error appears in the above-identified patent and that said Letters Patent is hereby corrected as shown below:

In the Claims

In column 16, line 28, in claim 10, after "instructions" insert -- to: --.

Signed and Sealed this
Eleventh Day of August, 2015

Michelle K. Lee
*Director of the United States Patent and Trademark Office*